US011762823B2

(12) United States Patent
Mohen et al.

(10) Patent No.: US 11,762,823 B2
(45) Date of Patent: *Sep. 19, 2023

(54) METHOD AND SYSTEM FOR CLONING ENTERPRISE CONTENT MANAGEMENT SYSTEMS

(71) Applicant: Open Text Corporation, Waterloo (CA)

(72) Inventors: Michael T. Mohen, Millington, MD (US); Christopher Dyde, Haddonfield, NJ (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,381

(22) Filed: Jan. 4, 2022

(65) Prior Publication Data

US 2022/0129429 A1 Apr. 28, 2022

Related U.S. Application Data

(63) Continuation of application No. 16/436,772, filed on Jun. 10, 2019, now Pat. No. 11,243,928, which is a (Continued)

(51) Int. Cl.
*G06F 16/22* (2019.01)
*G06Q 10/0631* (2023.01)
(Continued)

(52) U.S. Cl.
CPC .............. *G06F 16/22* (2019.01); *G06F 16/00* (2019.01); *G06F 16/214* (2019.01); *G06F 16/258* (2019.01); *G06Q 10/0631* (2013.01)

(58) Field of Classification Search
USPC ......................................... 707/812
See application file for complete search history.

(56) References Cited

U.S. PATENT DOCUMENTS 6,044,205 A * 3/2000 Reed ............... H04L 67/55
709/200
6,345,288 B1 * 2/2002 Reed ............... H04L 67/51
709/200

(Continued)

OTHER PUBLICATIONS

Office Action for U.S. Appl. No. 17/468,393, issued by the U.S. Patent and Trademark office, dated Feb. 3, 2023, 25 pages.

(Continued)

*Primary Examiner* — Cam Linh T Nguyen
(74) *Attorney, Agent, or Firm* — Sprinkle IP Law Group

(57) ABSTRACT

Cloning enterprise content management systems is described. A first remote procedure call is executed to a source database management system associated with a source enterprise content management system to retrieve a source object type from the source enterprise content management system. A second remote procedure call is executed to a target database management system associated with a target enterprise content management system to create a target object type in the target enterprise content management system, wherein the target object type is based on the source object type. Source metadata tables associated with the source object type are retrieved from the source enterprise content management system. The source metadata tables are stored as target metadata tables in the target enterprise content management system.

19 Claims, 3 Drawing Sheets

Related U.S. Application Data continuation of application No. 13/926,601, filed on Jun. 25, 2013, now Pat. No. 10,353,878.

(60) Provisional application No. 61/782,238, filed on Mar. 14, 2013.

(51) Int. Cl.
*G06F 16/00* (2019.01)
*G06F 16/25* (2019.01)
*G06F 16/21* (2019.01)

(56) References Cited

U.S. PATENT DOCUMENTS

| | | | | |
|---|---|---|---|---|
| 6,591,272 | B1* | 7/2003 | Williams | G06F 16/289 |
| | | | | 707/999.102 |
| 7,676,486 | B1* | 3/2010 | Tulkoff | G06F 16/214 |
| | | | | 707/999.102 |
| 8,874,621 | B1* | 10/2014 | Goodwin | G06F 16/289 |
| | | | | 707/756 |
| 10,353,878 | B1* | 7/2019 | Mohen | G06F 16/258 |
| 2002/0078174 | A1* | 6/2002 | Sim | H04L 67/101 |
| | | | | 709/219 |
| 2005/0187974 | A1* | 8/2005 | Gong | G06F 16/254 |
| 2005/0253739 | A1* | 11/2005 | Hu | G06F 16/258 |
| | | | | 341/1 |
| 2005/0256908 | A1* | 11/2005 | Yang | G06F 16/258 |
| 2008/0222192 | A1* | 9/2008 | Hughes | G06F 16/258 |
| | | | | 707/999.102 |
| 2011/0153562 | A1* | 6/2011 | Howard | G06F 16/275 |
| | | | | 707/620 |
| 2011/0282835 | A1* | 11/2011 | Cannon | G06F 16/119 |
| | | | | 707/622 |
| 2012/0150791 | A1* | 6/2012 | Willson | G06F 16/254 |
| | | | | 707/600 |
| 2012/0259810 | A1* | 10/2012 | Kopylovitz | G06F 16/214 |
| | | | | 707/E17.005 |
| 2012/0265726 | A1* | 10/2012 | Padmanabhan | G06F 16/214 |
| | | | | 707/602 |
| 2013/0173546 | A1* | 7/2013 | Cline | G06F 16/27 |
| | | | | 707/638 |
| 2016/0112247 | A1* | 4/2016 | Zhao | H04L 47/724 |
| | | | | 370/225 |
| 2019/0188191 | A1* | 6/2019 | Mohen | G06F 16/258 |
| 2021/0406234 | A1 | 12/2021 | Mohen | |
| 2023/0185427 | A1 | 6/2023 | Pitman | |

OTHER PUBLICATIONS

Notice of Allowance for U.S. Appl. No. 17/468,393, dated May 25, 2023, 8 pages.

* cited by examiner

METHOD AND SYSTEM FOR CLONING ENTERPRISE CONTENT MANAGEMENT SYSTEMS

CROSS REFERENCE TO RELATED APPLICATIONS

This application is a continuation of, and claims a benefit of priority under 35 U.S.C. 120 from, U.S. patent application Ser. No. 16/436,772, filed Jun. 10, 2019, entitled "METHOD AND SYSTEM FOR CLONING ENTERPRISE CONTENT MANAGEMENT SYSTEMS", now U.S. Pat. No. 11,243,928, which is a continuation of, and claims a benefit of priority under 35 U.S.C. 120 from, U.S. patent application Ser. No. 13/926,601 filed Jun. 25, 2013, entitled "METHOD AND SYSTEM FOR CLONING ENTERPRISE CONTENT MANAGEMENT SYSTEMS", now U.S. Pat. No. 10,353,878, which claims a benefit of priority under 35 U.S.C. 119 to U.S. Provisional Patent Application No. 61/782,238 filed Mar. 14, 2013, entitled "MIGRATION APPLIANCE", which are hereby fully incorporated herein by reference for all purposes.

BACKGROUND

An enterprise content management system provides online access to content stored using digital technology, information formerly available only on paper, microfilm, or microfiche. An enterprise content management system generates new metadata about content as the content is checked in and out. Information about how and when content is used can enable an enterprise content management system to acquire new filtering, routing and search pathways, and retention-rule decisions. An enterprise content management system provides access to data about email and instant messaging, which may be used in business decisions. The audit trail generated by an enterprise content management system enhances document security and provides metrics to help measure productivity and identify efficiency.

An enterprise content management system provides integrated solutions for multiple departments and systems, as many documents may cross multiple departments and affect multiple processes. For example, imaging, document management, and workflow can be combined in a customer service department to enable customer service agents to better resolve customer inquiries. Likewise, an accounting department may access supplier invoices from an electronic resource management system, access purchase orders from an imaging system, and access contracts from a document management system as part of an approval workflow. Similarly, an organization may present information via the World Wide Web, which requires managing web content.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

An organization may need to clone an existing enterprise content system to create a new or updated enterprise content management system, such as when moving the enterprise content management system from an on-site system to on-demand system stored in cloud storage. Cloning an enterprise content management system requires the cloning of the system's object type and metadata tables. In the prior art, cloning tools are inefficient because they are designed to clone a source environment that could be based on any of multiple database platforms, such that the clone is implemented in a target environment based on any of multiple database platforms, resulting in a permutation for every possible combination of database platforms. Furthermore, these prior art cloning tools use an inefficient application program interface to clone environments, which involves the high costs of acquiring sessions to indirectly interact with a database that is several layers below the application program interface, thereby cloning environments at a rate that may require weeks to complete the cloning process.

Embodiments herein enable cloning of enterprise content management systems. A first remote procedure call is executed to a source database management system associated with a source enterprise content management system to retrieve a source object type from the source enterprise content management system. In one embodiment, a cloning tool executes Java® code to retrieve the dcm_doc object type from a source Oracle® database used by a source Documentum® system. A second remote procedure call is executed to a target database management system associated with a target enterprise content management system to create a target object type in the target enterprise content management system, wherein the target object type is based on the source object type. For example, the cloning tool executes SQL commands to store the dcm_doc object type to a target Oracle® database to be used by a target Documentum® system. Source metadata tables associated with the source object type are retrieved from the source enterprise content management system. For example, the cloning tool retrieves source single value tables of metadata and source repeat value tables of metadata for the dcm_doc object type from the source Documentum® system. The source metadata tables are stored as target metadata tables in the target enterprise content management system. In an embodiment, the cloning tool stores the source single value tables of metadata and the source repeat value tables of metadata for the dcm_doc object type in the target Documentum® system. The cloning tool directly extracts and loads data at the database level, enabling the cloning of environments in days, rather than the weeks required by some prior art cloning tools.

Figure 1:
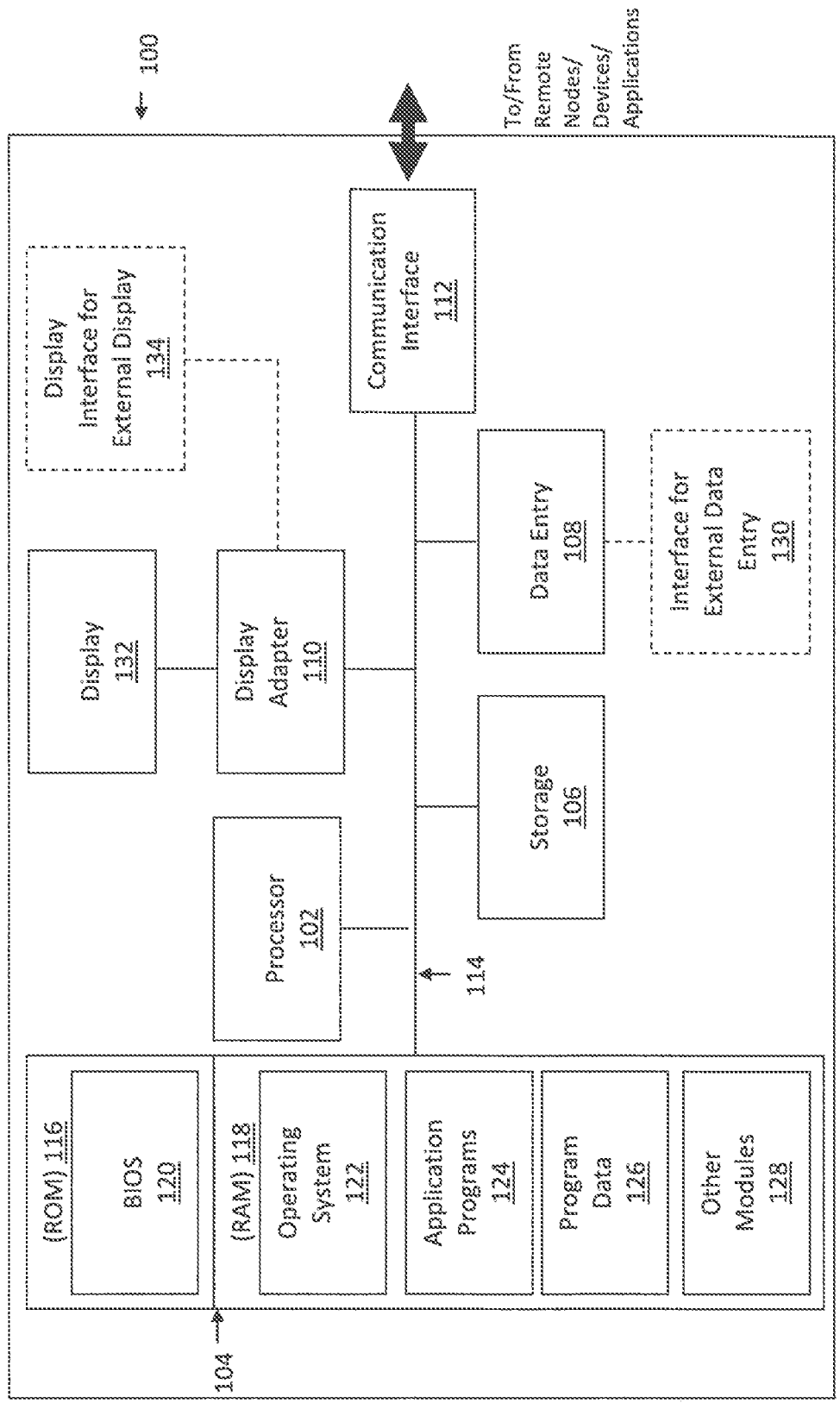
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random-access memory (RAM) 118. Memory 104 may be configured to store program instructions and data during operation of device 100. In various embodiments, memory 104 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, pes, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for cloning enterprise management systems.

In the prior art, some cloning tools use an application program interface to clone an enterprise content management system's object types and metadata tables at a rate which may require weeks to complete the cloning process. Embodiments herein provide a cloning tool that directly extracts and loads data at the database level, enabling the cloning of an enterprise content management system in days, rather than the weeks required by some prior art cloning tools.

Figure 2:
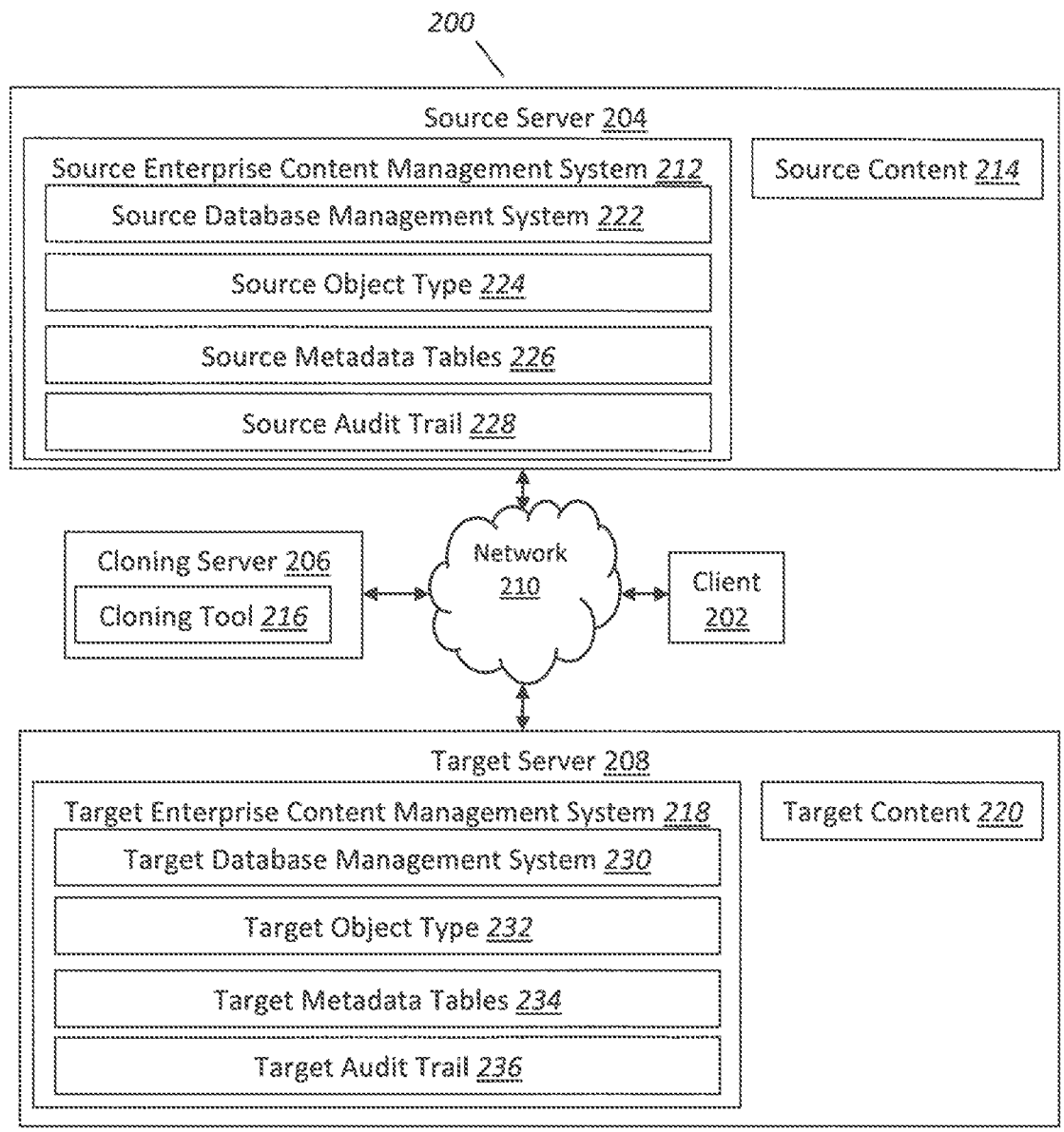
FIG. 2 illustrates a block diagram of an example system for cloning enterprise content management systems, under an embodiment.

FIG. 2 illustrates a block diagram of a system that implements cloning enterprise management systems, under an embodiment. As shown in FIG. 2, system 200 may illustrate a cloud computing environment in which data, applications, services, and other resources are stored and delivered through shared data centers and appear as a single point of access for the users. The system 200 may also represent any other type of distributed computer network environment in which servers control the storage and distribution of resources and services for different client users.

In an embodiment, the system 200 represents a cloud computing system that includes a client 202, and a source server 204, a cloning server 206, and a target server 208 that are provided by a hosting company. The client 202 and the servers 204-208 communicate via a network 210. The source server 204 includes a source enterprise content management system 212 associated with source content 214, the cloning server 206 includes a cloning tool 216, and the target server 208 includes a target enterprise content management system 218 associated with target content 220. Although the source content 214 is depicted as stored on the source server 204 and the target content 220 is depicted as stored on the target server 208, the source content 214 and the target content 220 may be stored on other servers that are associated with the servers 204 and 208, respectively, but not depicted in FIG. 2. The client 202 and the servers 204-208 may each be substantially similar to the system 100 depicted in FIG. 1.

The source enterprise content management system 212 includes a source database management system 222, a source object type 224, source metadata tables 226, and a source audit trail 228, all associated with the source content 214. Similarly, the target enterprise content management system 218 includes a target database management system 230, a target object type 232, target metadata tables 234, and a target audit trail 236, all associated with the target content 220. The source enterprise content management system 212 may be referred to as the source Documentum® system 212, and the target enterprise content management system 218 may be referred to as the target Documentum® system 218, each provided by EMC® Corporation. The source database management system 222 may be referred to as the source Oracle® database 222, and the target database management system 230 may be referred to as the target Oracle® database 230, each provided by Oracle® Corporation. While the examples described herein include the use of an Oracle® database, one skilled in the art would understand that other databases, such as SQL, could be used. The source object type 224 may be referred to as the dcm_doc object type 224, and the target object type 232 may also be referred to as the dcm_doc object type 232.

The source metadata tables 226 may be referred to as the source single value tables of metadata and source repeat value tables of metadata 226, and the target metadata tables 234 may be referred to as the target single value tables of metadata and the target repeat value tables of metadata 234. Although the metadata tables 226 and 234 may be described as single and repeat value tables of metadata 226 and 234, the metadata tables 226 and 234 may include additional types of metadata tables used by enterprise content management systems. Single value tables of metadata specify single values of metadata associated with the corresponding content, such as the corresponding title and the corresponding creation date for corresponding dcm_doc documents, and repeat value tables of metadata specify repeat values of metadata associated with the corresponding content, such as the corresponding multiple authors and the corresponding multiple keywords for the corresponding dcm_doc documents. Although FIG. 2 depicts only one source object type 224, only one source audit trail 228, only one target object type 232, and only one target audit trail 236 for the purposes of presenting an extremely simplified example, the system 200 may include any number of object types 224 and 232 and any number of audit trails 228 and 236.

A cloning tool may create a target enterprise content management system. For example, a system user accesses a web-based interface to the cloning tool 216 via the client 202 to create the target Documentum system 218. The cloning tool 216 creates the target enterprise content management system 218 to have the same docbase identifier for the repository as the docbase repository for the source enterprise content management system 212 so that the object identifiers for the system's objects, which are based on the first four digits of the docbase identifier, are retained for the cloning process. The cloning tool 216 may also validate that the newly created target enterprise content management system 218 is operating as designed, that networking is functioning, that ports are open, and that firewalls are not blocking traffic.

A cloning tool executes a first remote procedure call to a source database management system associated with a source enterprise content management system to retrieve a source object type from the source enterprise content management system. For example, the cloning tool 216 executes Lava® script to retrieve the dcm_doc object type 224, which includes schemas, metadata, and relationships, from the source Oracle® database 222 used by the source Documentum® system 212. The script can filter object types or extract all objects as needed, including custom objects. When the script retrieves the object types, the script generates a second script, such as SQL commands, to subsequently store the retrieved object types in a target environment, wherein the second script is based on the retrieved object types. Therefore, no database administrator is required to generate custom code to store custom object types. In contrast to prior art cloning tools that use an inefficient application program interface to retrieve object types, which involves the high costs of acquiring sessions to indirectly interact with a database that is several layers below the application program interface, the cloning tool 216 quickly executes efficient remote procedure calls to directly interact with a database at the level of the database. The cloning tool 216 has the memory, capacity, and capability to directly interact with an Oracle® database, a SQL® database, an IBM® DB2® database, or any other type of relational database. Although this example uses only a single dcm_doc object type to illustrate the cloning of an enterprise content management system, enterprise content management systems may have hundreds of different object types.

A cloning tool executes a second remote procedure call to a target database management system associated with a target enterprise content management system to create a target object type in the target enterprise content management system, wherein the target object type is based on a source object type. For example, the cloning tool 216 executes SQL commands to store the dcm_doc object type 224 as the dcm_doc object type 232 in the target Oracle® database 230 to be used by the target Documentum® system 218. The commands to store an object type in a target environment are automatically generated when a script is executed to retrieve the object type from a source environment, such that no database administrator is required to generate custom code to store custom object types. In contrast to prior art cloning tools that use an inefficient application program interface to create object types, which involves the high costs of acquiring sessions to indirectly interact with a database that is several layers below the application program interface, the cloning tool 216 quickly executes efficient remote procedure calls to directly interact with a database at the level of the database.

A cloning tool retrieves source metadata tables associated with a source object type from a source enterprise content management system. For example, the cloning tool 216 retrieves source single value tables of metadata and source repeat value tables of metadata 226 for the dcm_doc object type 224 from the source Documentum® system 212. In contrast to prior art cloning tools that execute on a source system and/or a target system to inefficiently retrieve metadata tables in small batches, such as in spreadsheet files, the cloning tool 216 quickly and efficiently retrieves metadata tables, which enables significant amounts of metadata to be migrated between enterprise content management systems in a very small amount of time.

A cloning tool stores source metadata tables as target metadata tables in a target enterprise content management system. For example, the cloning tool 216 stores the source single value tables of metadata and the source repeat value tables of metadata 226 as the target single value tables of metadata and the target repeat value tables of metadata 234 for the dcm_doc object type 232 in the target Documentum® system 218. The cloning tool 216 may also update the indexing in the target environment and execute re-platform scripts to change various attributes, such as the host name and folder paths. The cloning tool 216 may also start the repository in the target environment, execute tests to detect any errors, such as orphan files, and run a consistency checker to verify the state of the docbase. In contrast to prior art cloning tools that execute on a source system and/or a target system to inefficiently store metadata tables in small batches, such as in spreadsheet files, the cloning tool 216 quickly and efficiently stores metadata tables, which enables significant amounts of metadata to be migrated between enterprise content management systems in a very small amount of time. Furthermore, multiple instances of the cloning tool 216 may execute concurrently to expedite the migration of object types and metadata tables between enterprise content management systems.

A cloning tool may retrieve an audit trail from a source enterprise content management system and store the audit trail in a target enterprise content management system. For example, the cloning tool 216 retrieves the source audit trail 228 from the source Documentum® system 212 and stores the source audit trail 228 as the target audit trail 236 in the target Documentum® system 218. Migrating the audit trail may be deferred to a later time after the cloning process is complete to reduce the overall downtime for an enterprise content management system.

Now that all of the metadata tables have been migrated, the content may be migrated. A cloning tool may retrieve source content associated with a source enterprise content management system and store the source content as target content associated with a target enterprise content management system. For example, the cloning tool 216 retrieves the source content 214 associated with the source Documentum® system 212 and stores the source content 214 as the target content 220 associated with the target Documentum® system 218. Migrating content may be optional, particularly if the content is already stored in an off-site or on-demand filestore. In addition to content, the cloning tool 216 may also migrate operating systems, configuration files, user interface components, web applications, workflows, object lifecycles, and other information related to the operation of an enterprise content management system. The cloning tool 216 may also check the filestores and compare the size of the target content 220 against the source content 214.

A cloning tool may upgrade a target enterprise content management system to a next generation enterprise content management system. For example, the cloning tool 216 upgrades the target Documentum® system 218 from Documentum® version 5.3 to the next generation Documentum® version 6.7. The cloning tool 216 directly extracts and loads data at the database level, enabling the cloning of environments in days, rather than the weeks required by some prior art cloning tools.

Figure 3:
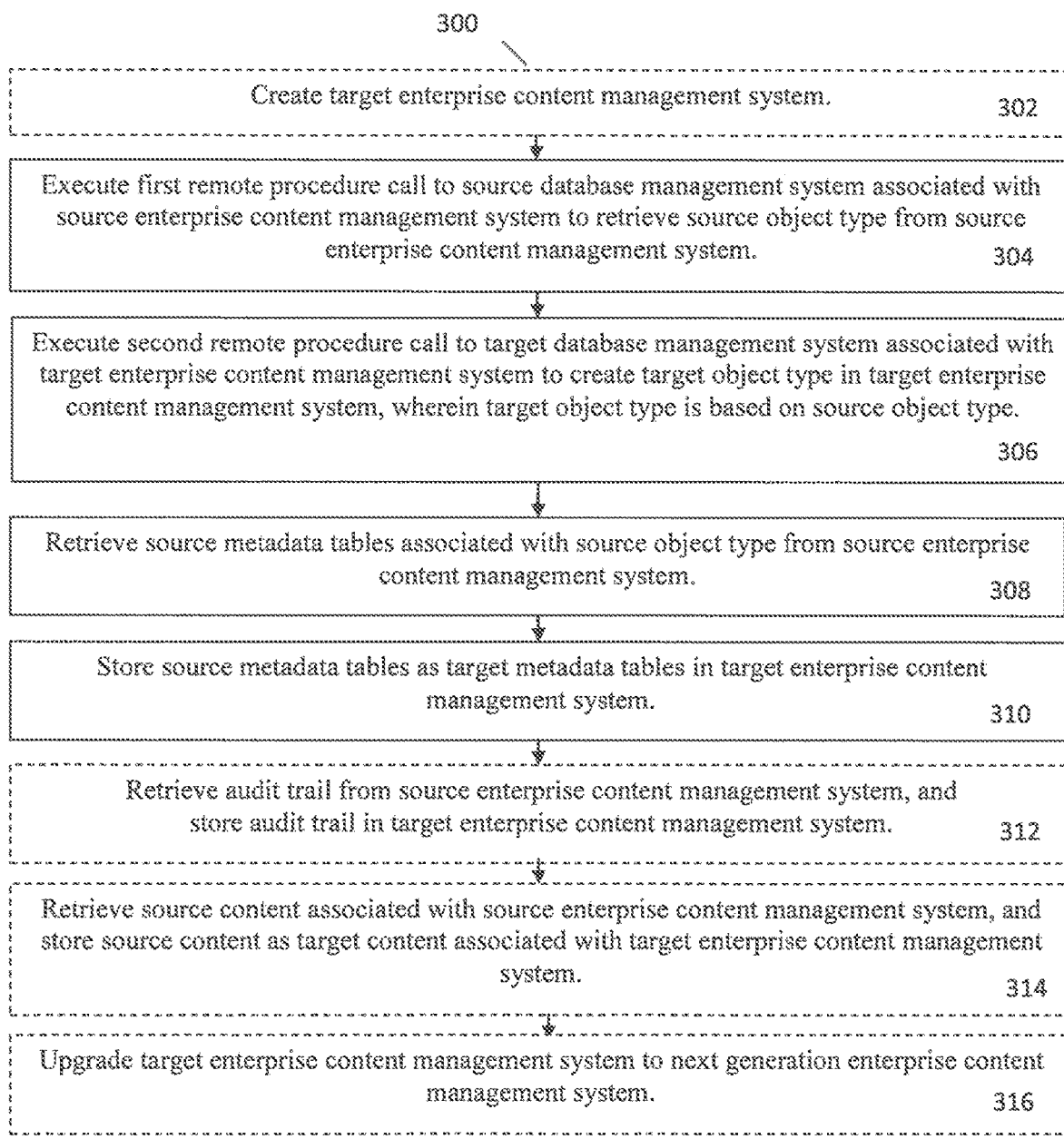
FIG. 3 is a flowchart that illustrates a method of cloning enterprise content management systems, under an embodiment.

FIG. 3 is a flowchart that illustrates a method of cloning enterprise content management systems. Flowchart 300 illustrates method acts illustrated as flowchart blocks for certain steps involved in and/or between the client 202 and/or the servers 204-208 of FIG. 2.

A target enterprise content management system is optionally created, act 302. For example, the cloning tool 216 creates the target Documentum® system 218.

A first remote procedure call is executed to a source database management system associated with a source enterprise content management system to retrieve a source object type from the source enterprise content management system, act 304. For example, the cloning tool 216 executes Java® script to retrieve the dcm_doc object type 224 from the source Oracle® database 222 used by the source Documentum® system 212.

A second remote procedure call is executed to a target database management system associated with a target enterprise content management system to create a target object type in a target enterprise content management system, wherein the target object type is based on a source object type, act 306. For example, the cloning tool 216 executes SQL commands to store the dcm_doc object type 224 as the dcm_doc object type 232 in the target Oracle® database 230 to be used by the target Documentum® system 218.

Source metadata tables associated with a source object type are retrieved from a source enterprise content management system, act 308. For example, the cloning tool 216 retrieves the source single value tables of metadata and source repeat value tables of metadata 226 for the dcm_doc object type 224 from the source Documentum® system 212.

Source metadata tables are stored as target metadata tables in a target enterprise content management system, act 310. For example, the cloning tool 216 stores the source single value tables of metadata and the source repeat value tables of metadata 226 as the target single value tables of metadata and the target repeat value tables of metadata 234 for the dcm_doc object type 232 in the target Documentum® system 218.

An audit trail is optionally retrieved from a source enterprise content management system, and stored in a target enterprise content management system, act 312. For example, the cloning tool 216 retrieves the source audit trail 228 from the source Documentum® system 212 and stores the source audit trail 228 as the target audit trail 236 in the target Documentum® system 218.

Source content associated with a source enterprise content management system is optionally retrieved and stored as target content associated with a target enterprise content management system, act 314. For example, the cloning tool 216 retrieves the source content 214 associated with the source Documentum® system 212 and stores the source content 214 as the target content 220 associated with the target Documentum® system 218.

A target enterprise content management system is optionally upgraded to a next generation enterprise content management system, act 316. For example, the cloning tool 216 upgrades the target Documentum® system 218 from Documentum® version 5.3 to the next generation Documentum® version 6.7.

Although FIG. 3 depicts the acts 302-316 occurring in a specific order, the acts 302-316 may occur in another order.

Embodiments herein enable cloning enterprise content management systems. The cloning tool 216 directly extracts and loads data at the database level, enabling the cloning of enterprises in days, rather than the weeks required by some prior art migration tools.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer-implemented method of cloning a content management system, the method comprising:
communicating over a network with a source server that comprises a source enterprise content management system that manages source content associated with the source enterprise content management system, the source enterprise content management system comprising a source database having a source database management system, a source object type, and a source metadata table associated with the source object type;
communicating over the network with a target server that comprises a target enterprise content management system that comprises a target database having a target database management system;
executing a first remote procedure call to the source database management system to directly interact with the source database at a level of the source database to retrieve the source object type from the source enterprise content management system;
executing a second remote procedure call to the target database management system to directly interact with the target database at a level of the target database to create a target object type in the target enterprise content management system, wherein the target object type is based on the source object type;

communicating over the network with the source server to retrieve the source metadata table from the source enterprise content management system; and communicating over the network with the target server to store the source metadata table in the target enterprise content management system as a target metadata table associated with the target object type.

2. The computer-implemented method of claim 1, wherein the source enterprise content management system comprises a source repository having a repository identification and storing source objects, wherein each source object has an object identification at least partially based on the repository identification, the method further comprising:

communicating over the network with the target server to create the target enterprise content management system to have a target repository with the same repository identification as the source repository; and communicating over the network with the source server and the target server to clone the source objects to the target repository as target objects with each target object retaining the object identification of the source object from which the target object was cloned.

3. The computer-implemented method of claim 1, wherein the source object type includes a schema, metadata and a relationship.

4. The computer-implemented method of claim 1, wherein the source metadata table comprises a source single value table and a source repeat value table and wherein the target metadata table comprises a target single value table and a target repeat value table.

5. The computer-implemented method of claim 1, further comprising:

executing a first script to execute the first remote procedure call and generate a second script based on the source object type, wherein the second script is executable to store the source object type in the target enterprise content management system as the target object type; and executing the second script to execute the second remote procedure call.

6. The computer-implemented method of claim 1, further comprising communicating over the network to retrieve a source audit trail from the source enterprise content management system and store the source audit trail as a target audit trail in the target enterprise content management system.

7. The computer-implemented method of claim 1, further comprising communicating over the network to retrieve the source content associated with the source enterprise content management system and store the source content as target content associated with the target enterprise content management system.

8. The computer-implemented method of claim 1, further comprising communicating over the network with the target server to upgrade the target enterprise content management system to a next generation.

9. The computer-implemented method of claim 1, further comprising communicating with the target server over the network to update an index of the target enterprise content management system.

10. The computer-implemented method of claim 1, wherein the source enterprise content management system comprises a source enterprise content management system application program interface, wherein the target enterprise content management system comprises a target enterprise content management system application program interface, wherein the level of the source database is below the source enterprise content management system application program interface, and wherein the level of the target database is below the target enterprise content management system application program interface.

11. A computer program product comprising a non-transitory computer readable medium storing computer-readable program code executable to:

communicate over a network with a source server that comprises a source enterprise content management system configured to manage source content associated with the source enterprise content management system, the source enterprise content management system comprising a source enterprise content management system application program interface, and a source database having a source database management system, a source object type, and a source metadata table associated with the source object type;

communicate over the network with a target server to create a target enterprise content management system that comprises a target enterprise content management system application program interface and a target database having a target database management system;

interact directly with the source database at a layer below the source enterprise content management system application program interface, wherein interacting directly with the source database comprises executing a first remote procedure call to the source database management system to retrieve the source object type from the source enterprise content management system;

interact directly with the target database at a layer below the target enterprise content management system application program interface, wherein interacting directly with the target database comprises executing a second remote procedure call to the target database management system to create a target object type in the target enterprise content management system, wherein the target object type is based on the source object type;

communicate over the network with the source server to retrieve the source metadata table from the source enterprise content management system; and communicate over the network with the target server to store the source metadata table in the target enterprise content management system as a target metadata table associated with the target object type.

12. The computer program product of claim 11, wherein the source enterprise content management system comprises a source repository having a repository identification and storing source objects, wherein each source object has an object identification at least partially based on the repository identification, and wherein the computer-readable program code is executable to:

communicate over the network with the target server to create the target enterprise content management system to have a target repository with the same repository identification as the source repository; and communicate over the network with the source server and the target server to clone the source objects to the target repository as target objects with each target object retaining the object identification of the source object from which the target object was cloned.

13. The computer program product of claim 11, wherein the source object type includes a schema, metadata and a relationship.

14. The computer program product of claim 11, wherein the source metadata table comprises a source single value table and a source repeat value table and wherein the target metadata table comprises a target single value table and a target repeat value table.

15. The computer program product of claim 11, wherein the computer-readable program code is executable to:
   execute a first script to:
      execute the first remote procedure call;
      generate a second script based on the source object type, wherein the second script is executable to store the source object type in the target enterprise content management system as the target object type; and
   execute the second script to execute the second remote procedure call.

16. The computer program product of claim 11, wherein the computer-readable program code is executable to communicate over the network to retrieve a source audit trail from the source enterprise content management system and store the source audit trail as a target audit trail in the target enterprise content management system.

17. The computer program product of claim 11, wherein the computer-readable program code is executable to communicate over the network to retrieve the source content associated with the source enterprise content management system and store the source content as target content associated with the target enterprise content management system.

18. The computer program product of claim 11, wherein the computer-readable program code is executable to communicate over the network with the target server to upgrade the target enterprise content management system to a next generation.

19. The computer program product of claim 11, wherein the computer-readable program code is executable to:
   communicate with the target server over the network to update an index of the target enterprise content management system.

* * * * *